(12) United States Patent
Hayashida et al.

(10) Patent No.: US 6,202,440 B1
(45) Date of Patent: Mar. 20, 2001

(54) PROCESS AND APPARATUS FOR SEPARATION OF STABLE ISOTOPE COMPOUND

(75) Inventors: Shigeru Hayashida; Katsuyoshi Kuwata; Hiroshi Kawakami; Ushio Maeda, all of Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/169,955

(22) Filed: Oct. 13, 1998

(30) Foreign Application Priority Data

Oct. 13, 1997 (JP) .................................................. 9-279223

(51) Int. Cl.⁷ ....................................................... F25J 1/00
(52) U.S. Cl. ............................................... 62/617; 62/919
(58) Field of Search .............................. 62/919, 617, 643, 62/906

(56) References Cited

U.S. PATENT DOCUMENTS

| | | | |
|---|---|---|---|
| 3,126,267 | * | 3/1964 | Vander Arend ......................... 62/617 |
| 3,399,967 | * | 9/1968 | Pogorski ................................. 62/919 |
| 3,421,334 | * | 1/1969 | McKinney et al. ..................... 62/919 |
| 3,487,651 | * | 1/1970 | Schleich et al. ........................ 62/919 |
| 5,644,932 | * | 7/1997 | Dunbobbin et al. ................... 62/906 |
| 5,653,126 | * | 8/1997 | Harada et al. .......................... 62/906 |
| 5,730,000 | * | 3/1998 | Sunder et al. .......................... 62/906 |

* cited by examiner

*Primary Examiner*—Ronald Capossela
(74) *Attorney, Agent, or Firm*—Oblon, Spivak, McClelland, Maier & Neustadt, P.C.

(57) ABSTRACT

Stable isotope atoms present in the form of stable isotope compounds, for example, $^{13}C$ present in the form of $^{13}CO$, are separated by distillation using a distillation column packed orderly with a formed packing, and preferably by distillation using a distillation column packed with a "promoting-fluid-dispersion type" structured packing.

22 Claims, 9 Drawing Sheets

PROCESS AND APPARATUS FOR SEPARATION OF STABLE ISOTOPE COMPOUND

BACKGROUND OF THE INVENTION

1. Field of the Invention

The present invention relates to a process and apparatus for distillation separation of stable isotope atoms present in the form of a stable isotope compound using a distillation column packed with formed packing. More specifically, the present invention relates to a process and apparatus for distillation separation using a distillation column packed with a so called "promoting-fluid-dispersion type" structured packing. By employing this process and apparatus, optimal separation of $^{13}CO$ and $^{12}CO$ can be obtained.

This application is based on patent application No. Hei 9-279223 filed in Japan, the content of which is incorporated herein by reference.

2. Description of the Related Art

Among stable isotope atoms, $^{13}C$, for example, is naturally existing in C at a ratio of 1.11%, and is naturally existing in CO at the same ratio in the form of $^{13}CO$.

A variety of isotope separation methods are available, including separation by thermal diffusion, gaseous diffusion, centrifuge, laser, chemical exchange, and distillation. In the case of CO isotope separation, a distillation separation method has conventionally been employed.

In the case of $^{13}C$ separation in the form of $^{13}CO$, starting material CO is typically separated into $^{12}CO$ and $^{13}CO$ using one or more distillation columns. Either, $^{13}CO$ is enriched in $^{12}CO$ from material CO by distillation.

The separation of an isotope gas mixture by distillation is characterized that a separation coefficient is extremely close to 1. In the case of a $^2CO/^{13}CO$ distillation, for example, the relative volatility, that is separation coefficient, is 1.005–1.009. For this reason, in order to obtain $^{13}CO$ having a purity of 99.9% or higher, 2000 or more theoretical plates are required. Moreover, a reflux flow rate as much as 1000-fold or more of draw-off rate at the bottom is needed. Accordingly, $^{13}CO$ and $^{12}CO$ separation has typically been carried out using a plurality of distillation columns.

Figure 9:
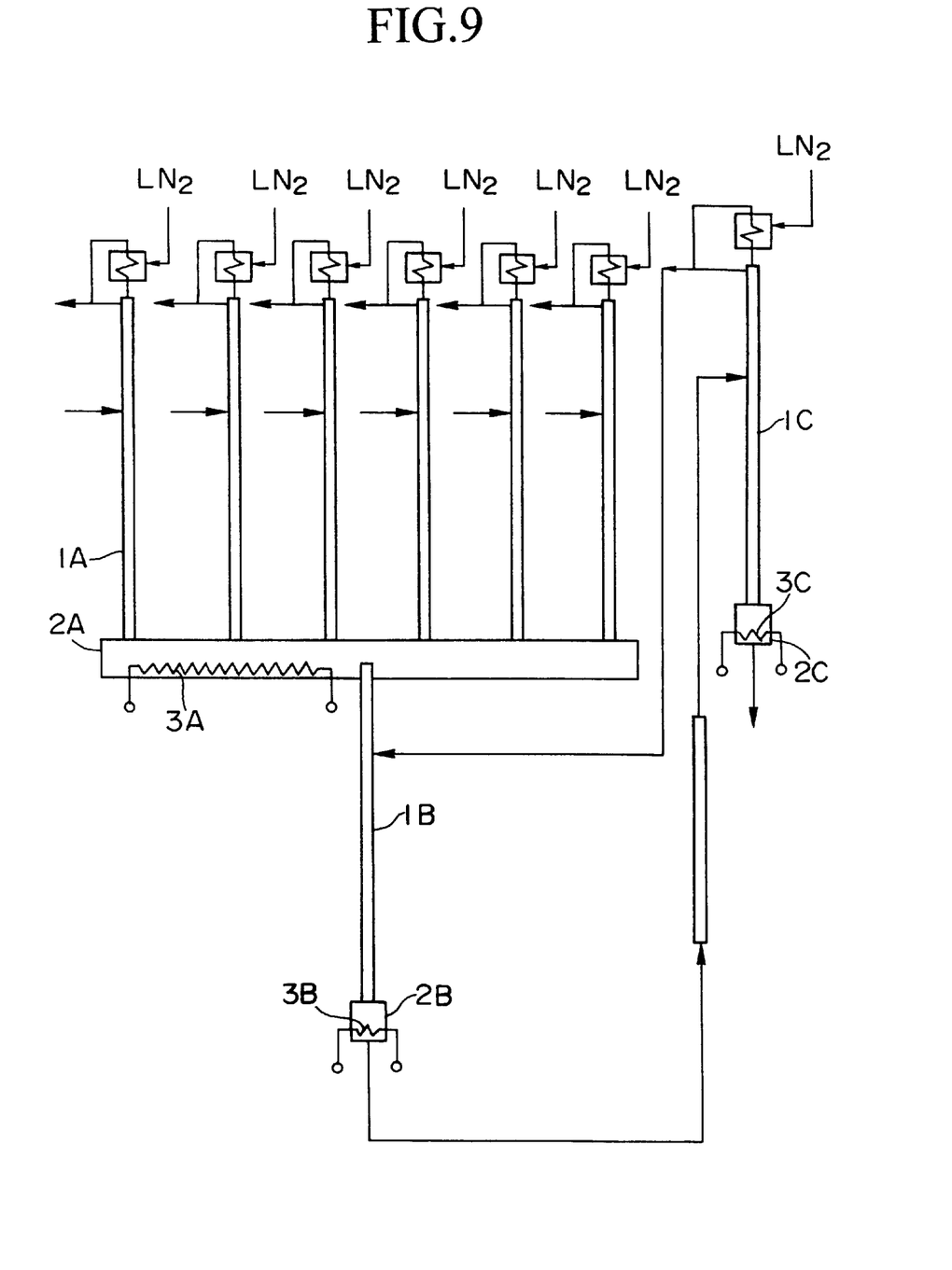
FIG. 9 is a flow diagram of an example of a conventional distillation apparatus for separating $^{13}CO$.

FIG. 9 shows an example of a conventional $^{13}CO$ separation and manufacturing apparatus. This conventional apparatus employs a plurality of distillation columns to produce 99.9% pure $^{13}CO$. In the figure, the symbols 1A, 1B and 1C indicate distillation columns, 2A, 2B and 2C are reboilers, and 3A, 3B and 3C are heaters.

In this apparatus, distillation column 1A has a column diameter of 25 mm, and is packed with a random packing such as Heri-pak (1.3×2.5×23 mm wire forms, manufactured by Pedbelniak, Inc.). Distillation column 1B has a column diameter of 50 mm and is packed with a random packing such as Pro-pak (manufactured by Scientific Development Co.). In general, when scaling up distillation columns employing random packing, it is necessary to increase the column diameter in response to the flow rate in the column to be processed. However, the selection of a random packing appropriate for the column diameter can be difficult, because of a reduction in the efficiency of distillation occurring due to muldistribution of the liquid. Thus, in order to maintain distillation efficiency, therefore the increase of the packed height is needed.

However, there is of course a limit to the height of the distillation column. Thus, in the case that the production rate exceeds the flow rate which can be processed by one column, a method has been employed wherein the number of distillation columns are increased in proportion to the production rate. This approach is inconvenient, however, as the composition of the apparatus becomes complicated.

In the above-described conventional system, when separating $^{13}CO$ and $^{12}CO$ to produce $^{13}CO$, if the column diameter is increased from 25 mm to 50 mm, then the flow rate which can be processed increases by 4-fold. Further, by changing the packing, an 8-fold increase in the processing flow rate is possible, however, the column height increases by 2.5-fold. Consequently, in order to separate $^{13}CO$ and 12CO using a 3-stage distillation column system such as shown in FIG. 9, to produce $^{13}CO$ having a purity of 99.9% at a rate of 2 mol/day, a design is necessary in which there are six distillation columns 1A having a column diameter of 50 mm and a column height of 100 m, and one distillation column 1B having a column diameter of 50 mm and a column height of 100 m.

Furthermore, the liquid hold-up employing this type of random packing is 20–30% of the column's internal volume, or 40–60% occasionally the case of a large amount. Thus, approximately 150 days are required from the time the apparatus begins operation until the entire column reaches the condition of steady state operation. This factor accordingly adds a considerable burden in terms of cost and the production schedule. This conventional method is reported in detail in the following reference:

B. B. McInteer, Los Alamos Scientific Laboratory, "Isotope Separation by Distillation Design of a Carbon-13 Plant", Separation Science and Technology, 15(3), pp 491–508 (1980).

Conventional distillation process use random packing, employing apparatus in which a number of enormous columns are provided standing side by side. Thus, the cost for constructing the apparatus is considerable as compared to the increase in production rate. Moreover, expanding the column capacity may be planned, however, no benefit of scale is obtained.

The demand for $^{13}C$ has grown in recent years accompanying its expanding applications. Accordingly, it has become necessary to increase production of this product. As one solution for increasing production, the column diameter may simply be increased as described above. However, this approach is difficult to carry out due to the requirement of increasing the column height. Moreover, if the number of existing apparatus is merely increased, no benefit from scale is obtained.

Therefore, when increasing the diameter of the column, it has become necessary to seek benefits from scale by specifying the state of gas-liquid contact, i.e., by specifying a packing having a shape and structure which satisfies fixed conditions, the packing method, and the operating conditions at which a maximum production rate can be obtained from a distillation column packed with that packing.

A method is also known for increasing production in which a new apparatus having a different structure is connected to the existing equipment in the form of a cascade. Namely, in this method, $^{13}CO$ that has been concentrated in the new apparatus is fed into the existing equipment, then concentrated and separated. By means of this method, production can be increased without changing the volume processed by the existing apparatus. In addition, equipment installation costs can be held in check.

In this case, however, consideration must be given as to how to incorporate the new apparatus's processes to match the volume processed by the existing apparatus. Moreover, in order to keep equipment costs low, it is preferable that the new apparatus have a small column diameter and column height.

SUMMARY OF THE INVENTION

The present invention resolves the aforementioned problems encountered in the conventional art by packing orderly of a distillation column with a formed packing, by packing with a ordered packing, or by packing with a so called "promoting-fluid-dispersion type" structured packing.

The "promoting-fluid-dispersion type" structured packing is a ordered packing having a shape such that the descending liquid and the ascending vapor flow over the surface thereof along the direction of the main flow (i.e., the direction of the column axis), while at the same time the liquid and vapor flows are guided at a right angle to the main flow direction, thereby promoting mixing of the liquid and vapor while accomplishing mass transfer.

In other word, the "promoting-fluid-dispersion type" structured packing is the formed packing, where the mass transfer is carried out with intimate vapor-liquid contact and the mixing of liquid and/or vapor is simultaneously promoted in the direction perpendicular to the direction of column axis.

By means of the present invention, it is possible to increase the column diameter in response to the flow rate to be processed, in the range of some specific pressure. Moreover, it is not necessary to select the packing in accordance with the change in the column diameter. Accordingly, it becomes possible to employ a compact apparatus to separate a compound containing stable isotope atoms from a gas mixture or liquid mixture containing the compound with the stable isotope atoms. Moreover, since the apparatus is compact, the liquid hold-up volume can be reduced, making it possible to start-up and reach steady state operations within a shorter period of time. In addition, since the pressure loss can be held to a low level, the pressure for the distillation operation can be reduced. Accordingly, a large value can be set for the separation coefficient, and the distillation efficiency can be increased. Thus, operations become easy. Also, by mean of the present invention, a process design for increasing production by adding a new distillation column employing a "promoting-fluid-dispersion type" structured packing is possible.

DESCRIPTION OF THE PREFERRED EMBODIMENTS

In contrast to the conventional technique of randomly dumped packing of a distillation column with a random packing, in the present invention, the distillation column is packed orderly with a formed packing.

Formed packing may be classified into ordered and random packing. Examples of random packing include Raschig rings, Pall rings, Lessing rings, Intercross saddles, Berl saddles, Intalox saddles, Telleratte packing, Pall rings, Steadman packing, and the like. The use of these packing in a variety of distillation columns has long been known.

In the present invention, the phrase "packing orderly (in a regular manner) using a formed packing" means packing with an ordered or random packing orderly (in a regular manner) to the extent that the computational formulas which follow below can be applied.

Ordered packing can be further classified into "promoting-fluid-dispersion type" structured packing, and non-"promoting-fluid-dispersion type" structured packing. A "promoting-fluid-dispersion type" structured packing is one having a shape and structure in which the flows of the liquid and vapor follow along the surface of the packing in opposition to one another, the liquid and vapor mixing in the direction perpendicular to the column axis (to the bulk flow), so that mixing of the gas and liquid is promoted as contact between the vapor and liquid is carried out. Where, bulk flow (main flow) means that ascending vapor flow and descending liquid flow in the distillation column along the axis of the columns, and means that to the flow defined in the field of mass transfer which occurred at the interface (i.e. boundary layer) of liquid and vapor or the packing surface. These are also called structured packing in which thin plates of aluminum, copper, aluminum-copper alloy, stainless steel, and various plastics or the like, are formed into a variety of regular forms, and then made into a laminated block.

Ordered packing, and in particular, "promoting-fluid-dispersion type" structured packing, are preferably employed as the formed packing in the present invention. When employing such promoting type packing, the reflux liquid and the flow of the ascending vapor become uniform. Moreover, in the case of the present invention, there is relatively little tendency for the liquid to shift toward the column wall, as occurs when employing random packing, thus the disadvantage of having an increased packed height when increasing the packing diameter, as in the case when randomly packing an random packing, is eliminated. Thus, it is possible to select the column diameter within a wide range in response to the production rate at the pressure in some specific range.

Figure 6:
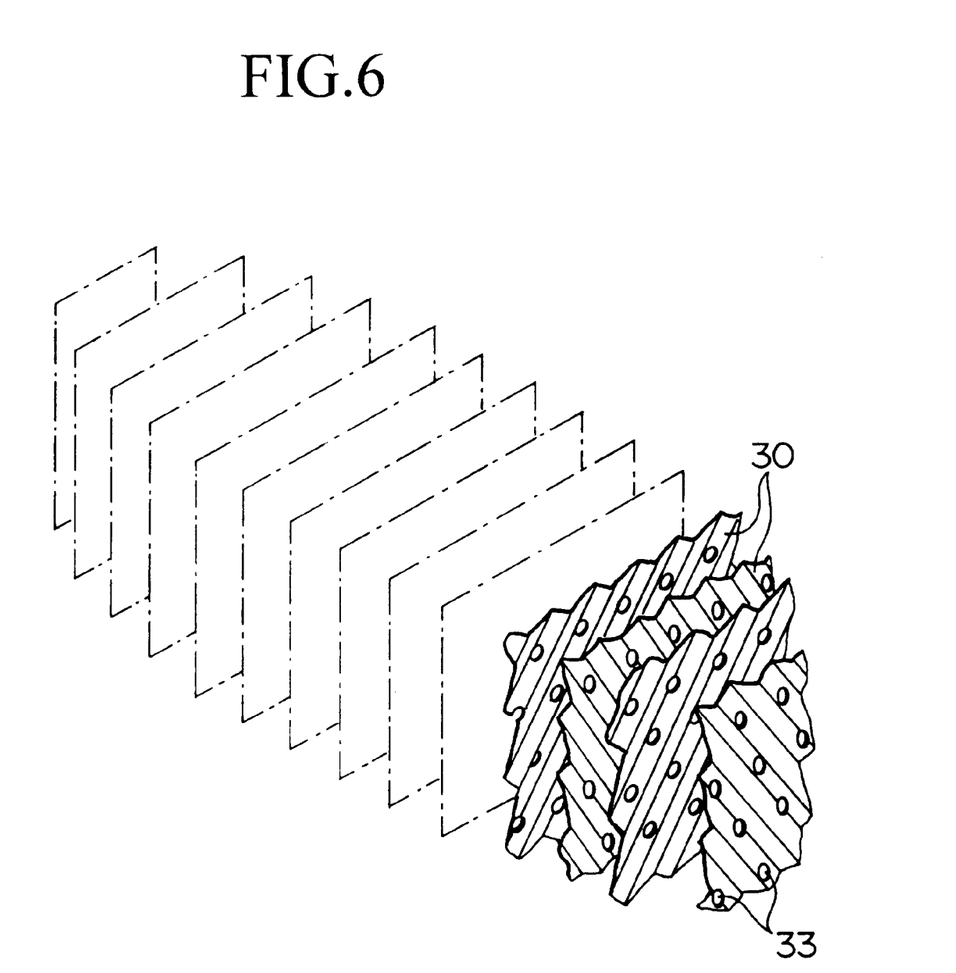
FIG. 6 is a diagonal view showing an example of a "promoting-fluid-dispersion type" structured packing.
Figure 7:
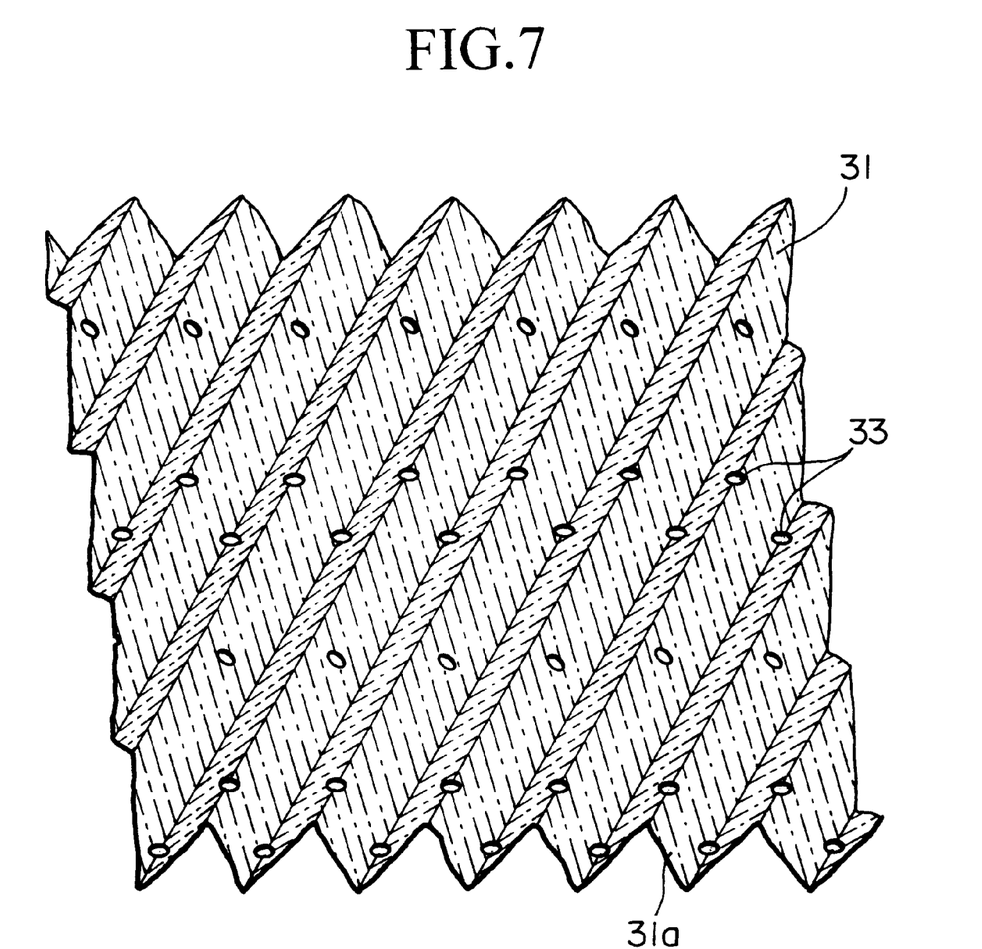
FIG. 7 is a diagonal view showing another example of a "promoting-fluid-dispersion type" structured packing.
Figure 8:
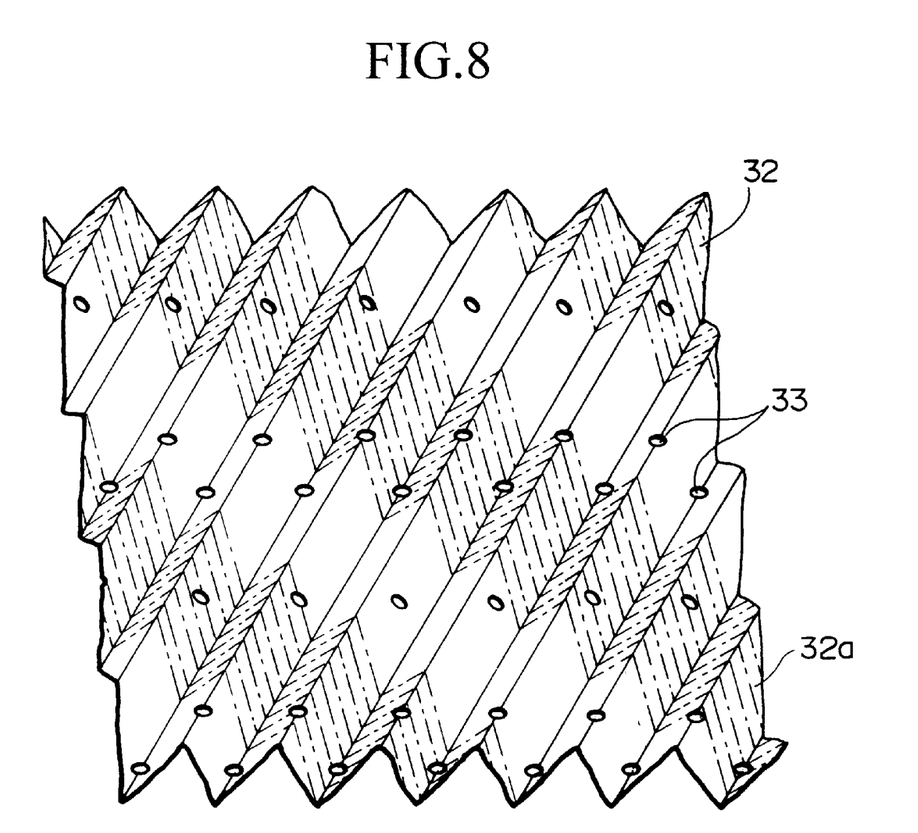
FIG. 8 is a diagonal view showing another example of a "promoting-fluid-dispersion type" structured packing.

Examples of traditional "promoting-fluid-dispersion type" structured packing are shown in FIGS. 6, 7 and 8. The example in FIG. 6 is disclosed in FIG. 3 of Japanese Patent Application, Second Publication No. Sho 57-36009. The example in FIG. 7 is disclosed in FIG. 1 of Japanese Patent Application, First Publication No. Sho 54-16761. The example in FIG. 8 is disclosed in FIG. 3 of Japanese Patent Application, First Publication No. Sho 54-15554.

All of these figures show the form of a wave-shaped thin plate, which is the structural component of the "promoting-fluid-dispersion type" structured packing. Small holes (number 33 in the figures) having a diameter of 2–4 mm are punched in a thin plate of a metal such as aluminum having a thickness of 0.1–0.3 mm with a fixed, regular distribution. The metallic plate is then molded into a wave shape.

In the case of the "promoting-fluid-dispersion type" structured packing 30 show in FIG. 6, a plurality of wave-shaped thin plates are disposed parallel to the column axis, and rendered into the form of a block by layering the plates so that they come into contact with one another. The wave-shaped grooves in each of the thin plates are inclined with respect to the column axis, and neighboring thin plates are disposed so as to intersect their wave-shaped grooves one another. Further, a plurality of holes 33 are provided in the thin plates. When each of the thin plates are disposed vertically, the holes form a plurality of rows along a direction which forms a right angle with the column axis. And in the rows, the holes have an interval of spacing therebetween. In a "promoting-fluid-dispersion type" structured packing 30 having this type of structure, the extent of the packing's ability to promote fluid distribution will vary depending on the distribution, size, and number of the plurality of holes 33 provided in the wave-shaped thin plates. Accordingly, inventions have been proposed which are characterized by the selection and combination of these conditions.

FIG. 7 shows a thin plate which is the structural unit of "promoting-fluid-dispersion type" structured packing 31. In this example, a thin plate is formed in a wave mold, to form the wave-shaped corrugation. In addition, extremely small wave-shaped grooves 31a having a constant angle with respect to the wave-shaped grooves are also provided in the thin plate. It is advantageous in this case to set the wave-shaped corrugation to be at an angle in the range of 15–60° with respect to the column axis, and to set the extremely small wave-shaped grooves 31a to be at an angle in the range of 15–90° with respect to the column axis. In addition, a length and height of 0.3–3 mm is advantageous for the extremely small wave-shaped grooves 31a.

In the "promoting-fluid-dispersion type" structured packing 32 shown in FIG. 8, extremely small wave-shaped grooves 32a having a fixed angle with respect to the wave-shaped corrugations are provided in the wave-shaped thin plates, while extremely small wave-shaped grooves 32a and the smooth parts in which extremely small wave-shaped grooves 32a are not provided are disposed in turn to one another.

These "promoting-fluid-dispersion type" structured packing 30, 31, and 32 are in the form of blocks. When packing a distillation column with these, it is preferable to carry out the stacking by rotating the loading angle for each blocks in the column cross-section (i.e., the angle for disposing the wave-shaped thin plates) by a fixed angle, for each blocks, or at fixed heights reached after layering a plurality of blocks. If this is done, the effect of achieving a uniform distribution is even further improved.

The detailed shape and structure of each of the various packing, their characteristics, and the characteristics of the packing method are introduced in Japanese Patent Application, First Publication No. Sho 58-26997, as well as in the three references cited above.

In contrast to these "promoting-fluid-dispersion type" structured packing, non "promoting-fluid-dispersion type" structured packing include ordered packing having a shape and structure which does not give increase to mixing of the liquid and vapor in the cross-sectional direction perpendicular to the column axis, examples including a plurality of pipes disposed parallel to the bulk flow of the process (direction of the column axis), or an arrangement in which a plurality of wave-shaped thin plates having convexities and concavities that are parallel to the column axis are stacked together to form a block, with a plurality of these blocks then stacked.

Figure 1:
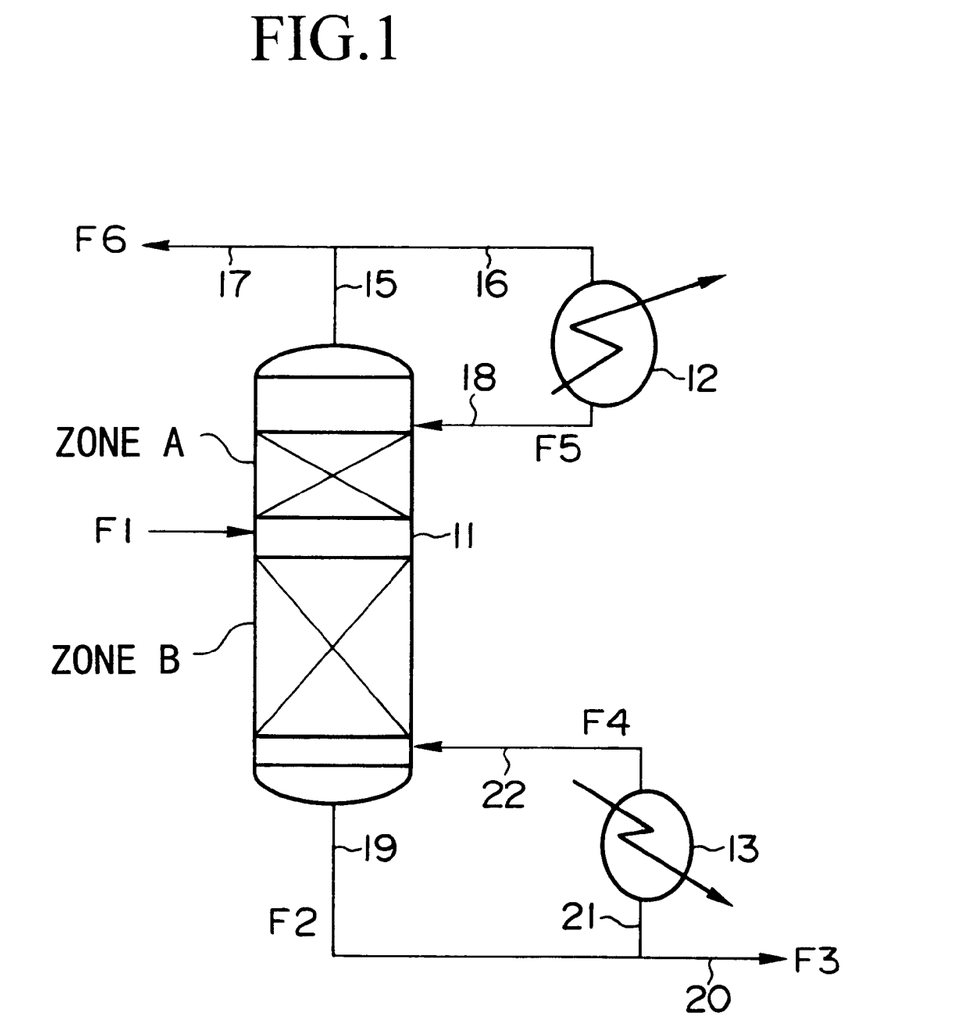
FIG. 1 is a flow diagram showing an example of a distillation apparatus provided with a distillation column packed with a "promoting-fluid-dispersion type" structured packing.

FIG. 1 is a flow diagram showing a first embodiment of the present invention's apparatus for separating a stable isotope compound. This apparatus employs a distillation column packed with a "promoting-fluid-dispersion type" structured packing to concentrate the $^{13}CO$ in CO at the bottom of the column. In the figure, 11 is a distillation column packed with a "promoting-fluid-dispersion type" structured packing; 12 is a condenser which primarily condenses $^{12}CO$ which has risen up within distillation column 11; and 13 is a reboiler which vaporizes the bottom liquid.

In this apparatus, the packing in distillation column 11 is disposed so as to be divided into upper zone A and zone B. A collector and a distributor are provided in between these zones to collect the liquid and redistribute it in a uniform manner. The collector and distributor are further provided at suitable position in each zone of A, B, and C.

Material gas F1 (feed gas) having as its primary component $^{12}CO$ containing 1.11% $^{3}CO$ passes through pipe 14, and is introduced at an intermediate point between the column's zone A and zone B at an intermediate part of distillation column 11. The introduced feed gas F1 rises while allowing liquid-gas contact with the reflux liquid that is descending from the upper part of the column.

The ascending gas reaches the top of the column as the $^{12}CO$ is being concentrated (i.e., while stripping the $^{13}CO$). The gas branches after being guided out from pipe 15, with one portion directed outside the system by pipe 17 as exhaust gas F6. The other portion of the gas which has branched off is introduced into condenser 12 by pipe 16, and condensed by means of a cooling source which is supplied to condenser 12 (supply source not shown in the figures). The condensed reflux liquid F5 is reintroduced to the upper part of distillation column 11 from pipe 18. Liquid nitrogen or the like from outside the system may be employed as the cooling source. As the reintroduced reflux liquid F5 descends through distillation column 11, it comes in contact with vapor rising from the bottom of the column, so that vapor-liquid contact is carried out. The $^{13}CO$ in the rising vapor is concentrated in the liquid and reaches the bottom of the column.

The descending liquid in which the $^{13}CO$ is concentrated remains for a period of time in the bottom of the column, and is then expelled via pipe 19 (bottom liquid F2). A portion of the liquid branches off to pipe 21, while the remaining portion is expelled as product (Draw off)F3 from pipe 20.

A portion of the bottom product F2 which has branched off to pipe 21 is introduced into reboiler 13, and vaporized by the heat supplied from a heat source. It is then introduced into the bottom of distillation column 11 as reboil gas F4 via pipe 22. Process gas, air, a heater or other optionally selected means may be employed as the heating source for reboiler 13. The reboil gas F4 introduced into distillation column 11 ascends within distillation column 11 as vapor-liquid contact is carried out with the descending liquid on the surface of the packing. $^{12}CO$ is concentrated in the ascending vapor, while $^{13}CO$ is concentrated in the descending liquid.

In this way, it becomes possible to reduce the column diameter and column height while realizing a large increase in the process volume in a apparatus that employs a formed packing, and preferably a "promoting-fluid-dispersion type" structured packing, for separation of an isotope compound, particularly $^{13}CO$ and $^{12}CO$, by studying the range of suitable operating conditions for a packing which has been selected for its suitable shape and specific surface area, i.e., by investigating the pressure loss and the superficial F-factor (densimetric superficial gas velocity) in the column.

When optimizing these conditions, the computational formulas primarily used in the past were theorized on the premise that vapor-liquid contact and mass transfer occurred in the sieve tray. The differences between the mechanism of vapor- liquid contact in the sieve tray and the mechanism of vapor-liquid contact in the wetted-wall column or in the packed column were not taken into consideration.

Therefore, in order to accurately design a distillation column packed with a ordered packing, the present inventors determined the computational formulas taking into consideration the differences in both the vapor-liquid contact, employed experiments to determine accurate values for the physical values employed in this computation, and then accurately calculated the parameters for the distillation column by means of computer simulations.

Specifically, $Sh_{GS}$ ($J_{GS}/N$) was employed in place of $Sh_{GS}$ for the Sherwood number of the vapor. The correlation between this Sherwood number $Sh_{GS}$ ($J_{GS}/N$), Reynold's number $Re_G$, and Schmidt's number $SC_{GS}$ was then determined using correlation data obtained through experiments in the wetted-wall column. This was then employed to perform computer simulations of processes in the present invention's process and apparatus using a numerical analysis method.

The aforementioned correlation can be expressed by the following formula.

$$Sh_{GS}(J_{GS}/N) = A_1 Re_G^{A_2} \cdot Sc_{GS}^{A_3} \tag{1}$$

$A_1$, $A_2$ and $A_3$ are constants determined depending on the system, and Sherwood's number, Reynold's number and Schmidt's number are defined according to the following formula.

$$Sh_{GS} = Nd/(\tau_{GS} D_{GS} \Delta \Omega_{GS}) \tag{2}$$

$$Re_G = \tau_G U_G d/\mu_G \tag{3}$$

$$Sc_{GS} = \mu_{GS}/(\rho_{GS} D_{GS}) \tag{4}$$

Where:

| | | |
|---|---|---|
| d | diameter of the wetted-wall column | [m] |
| L | height of wetted-wall column | [m] |
| | diffusion coefficient in a two component system | [m²/s] |
| J | diffusion flow speed | [kg/(m²·s)] |
| N | mass flux | [kg/(m²·s)] |
| μ | viscosity | [Pa·s] |
| ω | mass fraction | [kg/kg] |
| Δω$_{GS}$ | concentration driving force | [-] |
| U | speed | [m/sec] |
| ρ | density | [kg/m³] |
| ν | normal component of the surface velocity | [m/sec] |
| <subscripts> | | |
| G | gas or vapor | |
| S | vapor-liquid interface | |

Employing mass flux $V_t$ and $V_b$ for the vapor at the top and bottom of the wetted wall column, respectively, the average mass flux N for $^{13}CO$ is obtained from the following formula.

$$N = (V_b \omega_{GB} - V_t \omega_{GT})/\pi L d \tag{5}$$

Where, $\omega_G$ is the mass fraction for $^{13}CO$ in the vapor, and the relationship between N and J is expressed by the following formula.

$$N = J_{GS} + \rho P_{GS} \upsilon_{GS} \omega_{GS} \tag{6}$$

Where, $\rho_{GS} \upsilon_{GS}$ is the convective mass flux.

The difference of latent heat between $^{12}CO$ and $^{13}CO$ is presumed to be extremely small. Thus, it is assumed that the heat loss is extremely small as a result of super insulation, so that the term $\rho_{GS} \upsilon_{GS}$ may be ignored.

Thus, $$N = J_{GS} \tag{7}$$

$$V_b = V_t \tag{8}$$

The following formula is derived from formulas (1) and (7).

$$Sh_{GS} = A_1 Re_G^{A_2} \cdot Sc_{GS}^{A_3} \tag{9}$$

The average mass flux N is calculated using the following formula (10) which was obtained from formulas (5) and (8).

$$N = V_b (\omega_{Gb} - \omega_{Gt})/\pi L d \tag{10}$$

Accordingly, the Sherwood number may be determined employing formula (1) which is obtained from formulas (2) and (10). The coefficients $A_1$, $A_2$, and $A_3$ are determined through experiments.

Computer simulation using formula (1) above based on the obtained experimental values in the wetted wall column is then used to obtain optimal values for the distillation column's diameter and height, the pressure inside the column, flow rate, reflux ratio, concentration of the desired component which is concentrated at the bottom of the column, and the production rate, for the case where the above-described packing is employed.

When scaling up in order to increase the volume yield, it was the conventional practice to employ a method which increased the number of tall, narrow columns having a diameter of 50 mm and a height of about 100 m. By means of the present invention, however, it is possible to increase the column diameter while controlling the column height in the range of some fixed pressure, so that the structure may be simplified and the apparatus made more compact.

Further, by employing a "promoting-fluid-dispersion type" structured packing, the liquid hold up volume can be decreased. Thus, the time required for to start-up apparatus operation can be cut roughly in half as compared to the conventional art.

Next, as a second embodiment of the present invention, an example in which a new apparatus according to the present invention is connected to existing equipment in a cascade to enable an increase in the production of $^{13}CO$ will now be explained using FIG. 4.

The same numeric symbols have been applied to components which are the same as in FIG. 1, and an explanation thereof is omitted. Also note that while the existing equipment is formed of a plurality of distillation columns, for the sake of convenience, these will all be grouped together and indicated merely as one existing distillation column (23 in the figures).

This apparatus is provided with a line 14 for introducing material gas F1 into an intermediate part in new distillation column 11, a line 20 for supplying the bottom liquid F2 thereof, or at least a portion of the bottom vapor, to the middle part of distillation column 23 of the existing separation apparatus, and pipe 25 for returning exhaust gas from the existing apparatus to an intermediate part of distillation column 11.

The packing inside new distillation column 11 is disposed so as to be divided into three zones A, B, and C. A collector and distributor are disposed in between these zones and suitable position in the each zone of A, B, and C to collect and uniformly redistribute the liquid.

A pump 26 provided to pipe 20 in this apparatus. As a result, bottom liquid F2 or a portion F3' of the bottom vapor in new distillation column 11 is introduced to an intermediate part in existing distillation column 23. Distillation is carried out within this column using a known method. Product F7 in which the $^{13}CO$ has been further concentrated is guided out via pipe 24 from the bottom of the column. Return gas F8 is introduced to an intermediate area between of zones B and C of distillation column 11 via pipe 25 from the upper part of existing distillation column 23. The site of introduction of this return gas F8 is an intermediate area between the introduction port for feed gas F1 and the column bottom in distillation column 11, and is the port where the $^{13}CO$ gas composition has a concentration which is roughly equal to the concentration of $^{13}CO$ in return gas F8.

The $^{13}CO$ concentration at the position of introduction of return gas F8 is determined by calculation of the $^3CO$ concentration distribution inside the new distillation column 11 according to the detailed design described above, and is designed so that the concentration of return gas F8 and the concentration at the position of introduction are equal.

The flow rate of return gas F8 is the value obtained when the flow rate of product F7 is subtracted from the flow rate of the portion F3' of the bottom liquid. The flow rate of return gas F8 and the portion F3' of the bottom liquid are both small compared to the flow rate of the ascending vapor or the reflux rate inside distillation column 11. Accordingly, they do not have a large effect on the pressure distribution, concentration distribution or the like inside distillation column 11.

Figure 5:
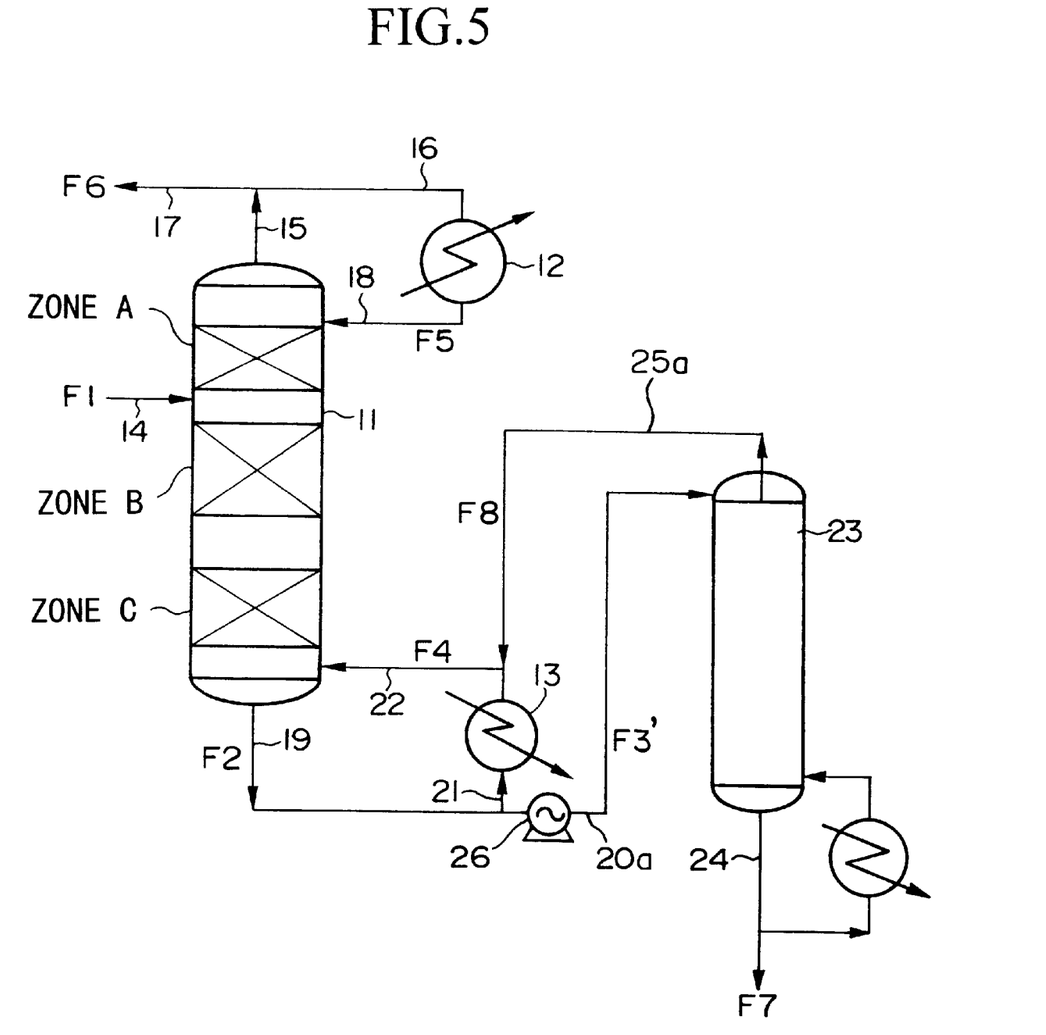
FIG. 5 is a flow diagram showing another example of connection when a new distillation column is added to an existing distillation column.

FIG. 5 shows another example for connecting a new distillation column 11 according to the present invention to an existing distillation column 23 by means of a cascade.

This apparatus is provided with a line 14 for introducing material gas F1 into an intermediate part in new distillation column 11, a line 20a for supplying the bottom liquid F2 thereof, or at least a portion of the bottom vapor, to the upper part of distillation column 23 of the existing separation apparatus, and line 25a for returning exhaust gas from the existing apparatus to the bottom of distillation column 11.

Figure 4:
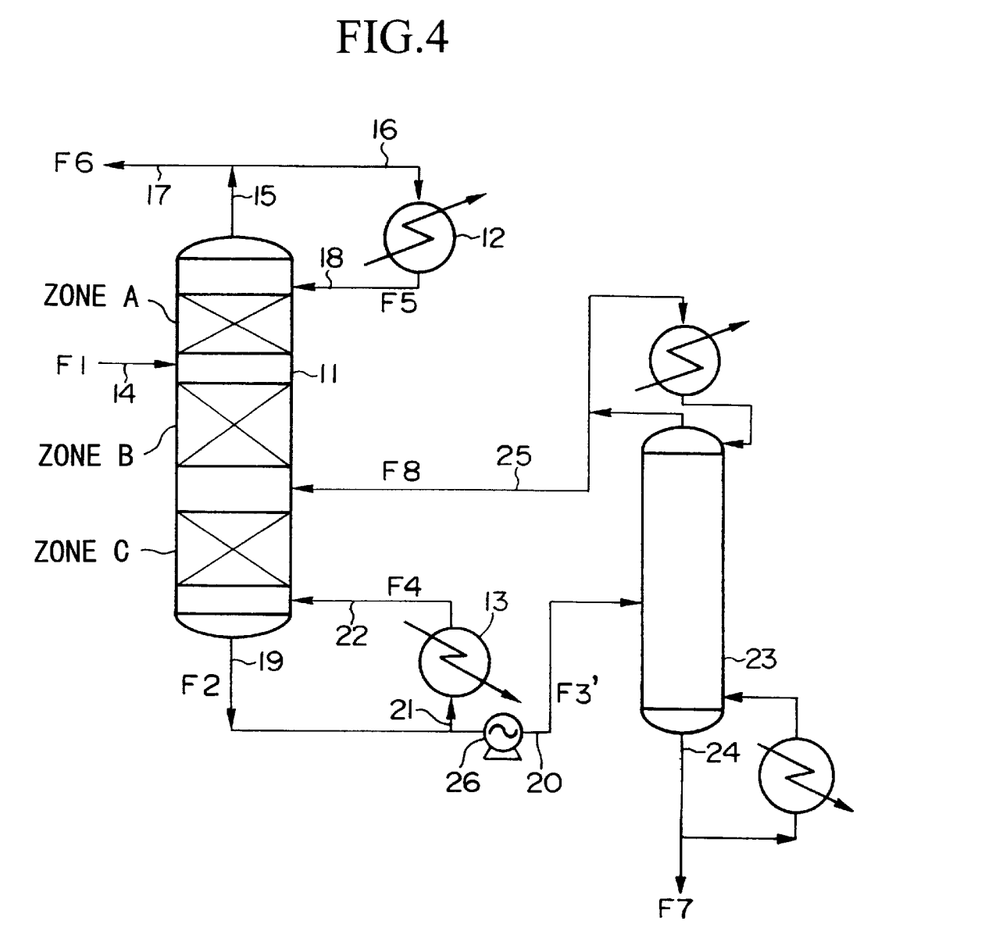
FIG. 4 is a flow diagram showing one example of connection when a new distillation column is added to an existing distillation column.

This apparatus differs from that shown in FIG. 4 in that a portion F3' of bottom liquid F2 of the new distillation column 11 is supplied to the top of the column of the existing distillation column 23, and serves as the reflux liquid for distillation column 23. And return gas F8 expelled from the top of distillation column 23 is introduced to the bottom of the column of the new distillation column 11, to serve as the gas which ascends through distillation column 11.

EMBODIMENTS (Cases 1–3)

Computer simulations according to the conditions shown in Table 1 were carried out using the apparatus shown in FIG. 1.

The specific surface area of the packing employed was 500 m$^2$/m$^3$ in the first embodiment (Case 1), 750 m$^2$/m$^3$ in the second embodiment (Case 2), and 900 m$^2$/m$^3$ in the third embodiment (Case 3). The column diameter was held constant at 0.305 m. The packed height of the packing was held constant at 150 m. Feed gas F1, which is the starting material, contained 1.11% CO, and had a flow rate of 0.05 mol/s. The yield of product F3 was approximately 10% of the feed gas volume, while the pressure of the exhaust gas F6 was 0.81 bar.

TABLE 1

|  | CASE 1 | CASE 2 | CASE 3 |
|---|---|---|---|
| Packing | A | B | C |
| Specific surface area of packing [m$^2$/m$^3$] | 500 | 750 | 900 |
| Column inner diameter [m] | 0.305 | 0.305 | 0.305 |
| height of upper portion of column [m] | 36 | 48 | 52 |
| height of lower portion of column [m] | 114 | 102 | 98 |
| Total height of column* [m] | 150 | 150 | 150 |
| Reboiler [kW] | 45.6 | 38.8 | 24.7 |
| Reynold's number [–] | 4350 | 2450 | 1300 |
| Superficial F-factor (Densimetric superficial velocity) in column [m/S(kg/m$^3$)$^{1/2}$] | 1.7 | 1.2 | 0.8 |
| Pressure [bar] | 0.8–1.0 | 0.8–1.2 | 0.8–1.0 |
| Total hold-up volume (liquid) [m$^3$] | 0.521 | 0.517 | 0.511 |
| Total hold-up volume [kmol] | 14.7 | 14.6 | 14.5 |

*Total column height does not include height of distributor or collector.

The reboiler's heater capacity, the flow rate of the ascending vapor accompanying that heater capacity, the pressure loss, and the like were optimized as operating conditions. Namely, the reboiler's heater capacity, reflux rate, etc. were varied, and computer simulations where carried out after taking into consideration the pressure loss characteristics of the packing. The results for obtaining these conditions under optimal operation are shown in Table 2.

TABLE 2

|  | CASE 1 | CASE 2 | CASE 3 |
|---|---|---|---|
| F1 Feed gas |  |  |  |
| Pressure [bar] | 0.84 | 0.95 | 0.90 |
| Flow rate (normalized) [–] | 1.000 | 1.000 | 1.000 |
| $^{13}CO$ ratio [–] | 0.0111 | 0.0111 | 0.0111 |
| F2 Bottom liquid (recycled) |  |  |  |
| Pressure [bar] | 0.92 | 1.21 | 1.04 |
| Flow rate (normalized) [–] | 184.4 | 159.8 | 100.8 |
| $^{13}CO$ ratio [–] | 0.0424 | 0.0593 | 0.0597 |
| F3 Product gas (Draw off) |  |  |  |
| Pressure (bar) | 0.92 | 1.21 | 1.04 |
| Flow rate (normalized) [–] | 0.108 | 0.108 | 0.108 |
| $^{13}CO$ ratio [–] | 0.0424 | 0.0593 | 0.0597 |
| F4 Reboiler gas |  |  |  |
| Pressure [bar] | 0.92 | 1.21 | 1.04 |
| Flow rate (normalized) [–] | 184.3 | 159.7 | 100.7 |
| $^{13}CO$ ratio [–] | 0.0424 | 0.0593 | 0.0597 |
| F5 Reflux liquid |  |  |  |
| Pressure [bar] | 0.81 | 0.81 | 0.81 |
| Flow rate (normalized) [–] | 183.3 | 156.4 | 99.7 |
| $^{13}CO$ ratio [–] | 0.00731 | 0.00528 | 0.0052 |
| F6 Exhaust gas |  |  |  |
| Pressure [bar] | 0.81 | 0.81 | 0.81 |
| Flow rate (normalized) [–] | 0.892 | 0.892 | 0.892 |
| $^{13}CO$ ratio [–] | 0.00731 | 0.00528 | 0.0052 |

The $^{12}CO/^{13}CO$ relative volatility is known to change according to the pressure. In other words, the more the operating pressure falls, the larger the relative volatility and the easier separation become. A low operational pressure facilitates separation is therefore beneficial as an operating condition.

The pressure loss when employing a "promoting-fluid-dispersion type" structured packing is approximately 0.1 bar per column, or 0.4 bar per column in the case of large loss. This represents a marked reduction as compared to a pressure loss of approximately 1 bar in the case where a random packing is employed.

Accordingly, the operating pressure in the present invention's distillation column can be set to be near or less than atmospheric pressure over the entire area. Namely, the operating pressure can be set to be in the range of 0.8–1.2 bar, or in the range of 0.8–1.5 bar in the case where there is a large pressure loss.

As shown in Tables 1 and 2, when varying the specific surface area of the packing between 500, 750, and 900 $m^2/m^3$, the concentration of $^{13}CO$ in the product under optimal operating conditions for the distillation column is 4.24%, 5.93% and 5.97%, respectively. The product yield when the specific surface area of the packing is 750 $m^2/m^3$ and 900 $m^2/m^3$ enters a roughly saturated state. If an attempt is made to obtain an equivalent yield using a packing having a higher specific surface area, then flooding tends to occur readily. Thus, it may be understood that the optimal specific surface area is in the range of 500–1000 $m^2/m^3$, and more preferably, in the range of 750–1000 $m^2/m^3$.

In the above-described simulation, the superficial F factor of vapor (the densimetric superficial velocity) in a column, FS, was studied in the range of 2.0 m/s $(kg/m^3)^{1/2}$ or less. Because it is confirmed that flooding was occurred over the range of the above value.

When the ratio of reboiler gas F4 and product F3, i.e., the ratio of the boil-up rate and the product rate, in FIG. 1 is taken, values of 1706, 1479 and 932 are obtained for Cases 1, 2, and 3, respectively. Accordingly, the ratio of the boil-up rate and the product rate has an optimal value in the range of around 900–2000.

A collector and distributor are provided for collecting and uniformly redistributing liquid inside distillation column 11. The liquid hold-up volume inside the distillation column is approximately 10–15%, however, even when taking into consideration the liquid that remains in the collector and distributor. This value is approximately half that seen in the conventional method. Accordingly, the start-up time, which has conventionally been about 150 days, can be reduced by about half. This has considerable merit, then, in terms of production costs and the production schedule.

Figure 2:
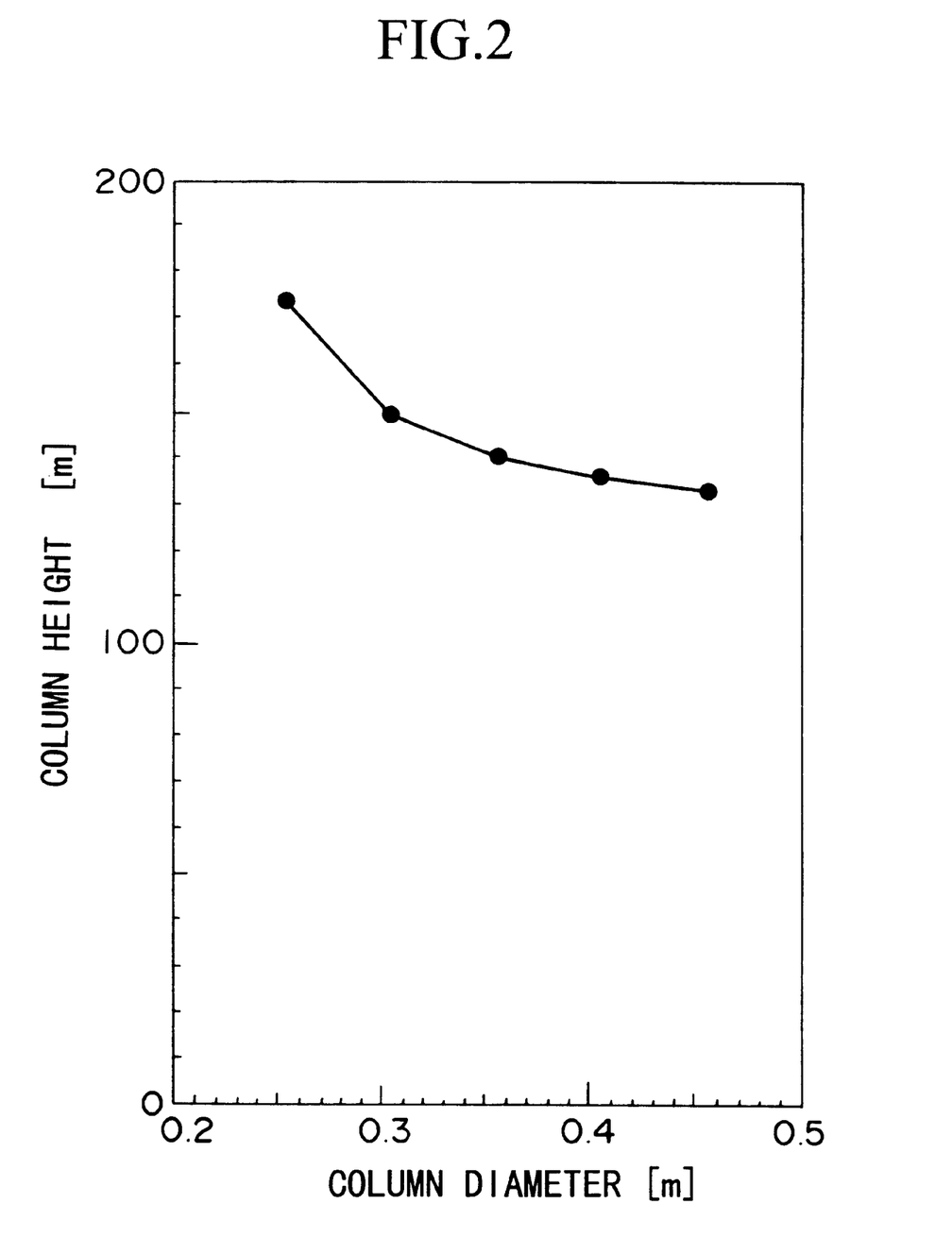
FIG. 2 is a graph showing the relationship between column height and column diameter in a distillation column packed with a "promoting-fluid-dispersion type" structured packing.
Figure 3:
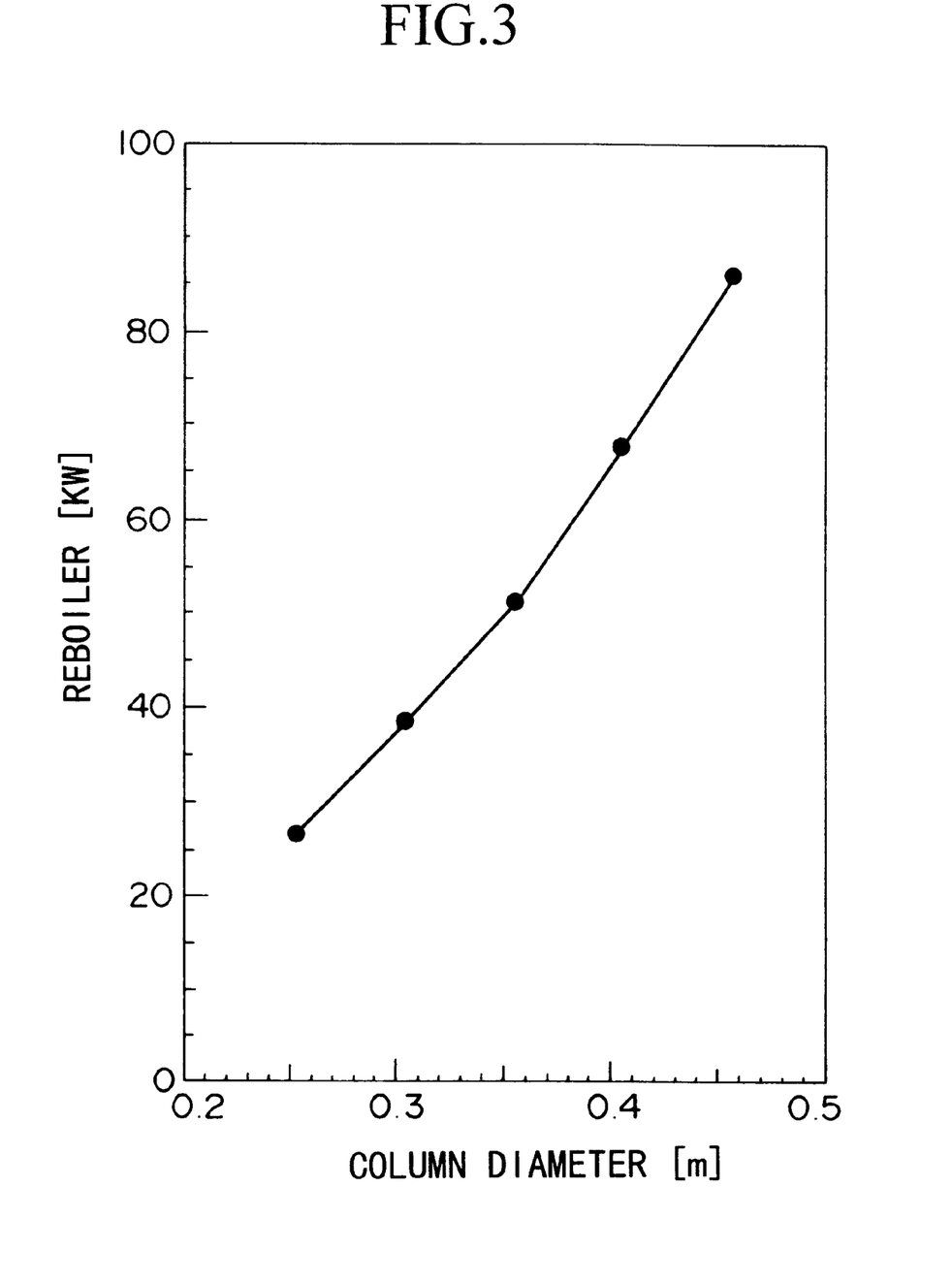
FIG. 3 is a graph showing the relationship between column diameter and the reboiler heating volume of a distillation column packed with a "promoting-fluid-dispersion type" structured packing.

With respect to the operating conditions for distillation column 11 packed with a ordered packing, the relationship between column diameter and column height when the concentration of $^{13}CO$ in the product becomes constant, and the relationship between the required heat volume of the reboiler and the column diameter corresponding to the former relationship, were studied for the case where the specific surface area of the packing is 750 $m^2/m^3$. The results of the study of the former and later relationships are shown in FIG. 2 and FIG. 3, respectively. The other operating conditions are the same as the values shown in Table 1.

As may be understood from FIG. 3, by increasing the column diameter, the heat capacity of the reboiler can be increased roughly in proportion to the column diameter of the column as an operational condition for distillation column 11. Since the ratio of the boil-up flow rate and the product flow rate can be increased, the column height is decreased accompanying the increase in column diameter under the condition of a fixed $^{13}CO$ concentration in the product, as shown in FIG. 2. However, little effect is gained from increasing the column diameter above 0.4 m in order to decrease the column height.

Namely, in the case of the apparatus shown in FIG. 1, it may be understood that a column diameter in the range of 0.25–0.5 m, and preferably in the range of 0.3–0.4 m, is optimal. However, when an even greater production rate is required, it is possible to increase the column diameter without increasing the column height to obtain an increase in the rate of product yielded in the range of some fixed pressure.

The distillation column parameters for the case where providing a distillation column 11 having a production rate on the order of 0.05 mol/s were obtained in these cases. However, these parameters are also applicable in general parameters for an apparatus that concentrates $^{13}CO$ that is present in nature at a ratio of 1.11%. In other words, when determining the parameters for a distillation column in the case where providing the whole process, recalculation may be performed using the aforementioned data as a base.

(Cases 4,5)

These cases are increasing of the operation pressure for above cases. Decreasing of the diameter of column and cost decreasing can be possible by increasing of the operation pressure.

Computer simulations according to the conditions shown in Table 3 were carried out using apparatus shown in FIG. 1 as same as Case 1, 2, and 3.

The specific surface area of the used packed is 750 $m^2/m^3$ for the both Cases 4 and 5, diameter of the column are 0.270 m, 0.255 m respectively, packed heights are 165 m, 183 m, material feed gas F1 is CO gas contained $^{13}CO$ 1.11%, approximately 0.05 mol/s of flow rate, flow of product gas F3 is about 10% of feed gas, the pressure of the exhaust gas is 0.81 bar.

TABLE 3

|  | CASE 4 | CASE 5 |
|---|---|---|
| Packing | B | B |
| Specific surface area of packing [$m^2/m^3$] | 750 | 750 |
| Column inner diameter [m] | 0.270 | 0.255 |
| height of upper portion of column [m] | 53 | 59 |
| height of lower portion of column [m] | 112 | 124 |
| Total height of column* [m] | 165 | 183 |
| Reboiler [kW] | 37.4 | 36.5 |
| Reynold's number [–] | 3000 | 3200 |
| Superficial F-factor (Densimetric superficial velocity) in column [$m/S(kg/m^3)^{1/2}$] | 1.2 | 1.2 |
| Pressure [bar] | 1.5–2.0 | 2.0–2.5 |
| Total hold-up volume (liquid) [$m^3$] | 0.446 | 0.441 |
| Total hold-up volume [kmol] | 12.6 | 12.5 |

*Total column height does not include height of distributor or collector.

Computer simulation is carried out as same as Case 1, 2, and 3 to calculate each variables. Result obtained optimal condition is shown in Table 4.

TABLE 4

|  | CASE 4 | CASE 5 |
|---|---|---|
| F1 Feed gas |  |  |
| Pressure [bar] | 1.65 | 2.17 |
| Flow rate (normalized) [–] | 1.000 | 1.000 |
| $^{13}CO$ ratio [–] | 0.0111 | 0.0111 |

TABLE 4-continued

|  | CASE 4 | CASE 5 |
|---|---|---|
| F2 Bottom liquid (recycled) | | |
| Pressure [bar] | 1.94 | 2.48 |
| Flow rate (normalized) [−] | 159.8 | 159.8 |
| $^{13}$CO ratio [−] | 0.0589 | 0.0588 |
| F3 Product gas | | |
| Pressure [bar] | 1.94 | 2.48 |
| Flow rate (normalized) [−] | 0.108 | 0.108 |
| $^{13}$CO ratio [−] | 0.0589 | 0.0588 |
| F4 Reboiler gas | | |
| Pressure [bar] | 1.94 | 2.48 |
| Flow rate (normalized) [−] | 159.7 | 159.7 |
| $^{13}$CO ratio [−] | 0.0589 | 0.0588 |
| F5 Reflux liquid | | |
| Pressure [bar] | 1.50 | 2.00 |
| Flow rate (normalized) [−] | 156.4 | 156.4 |
| $^{13}$CO ratio [−] | 0.0053 | 0.0053 |
| F6 Exhaust gas | | |
| Pressure [bar] | 1.50 | 2.00 |
| Flow rate (normalized) [−] | 0.892 | 0.892 |
| $^{13}$CO ratio [−] | 0.0053 | 0.0053 |

Diameter of columns can be decreased by increasing an operation pressure, however, column heights are also increased a little. Further, hold up volume in the column are decreased, so the required time for start up is also decreased.
(Case 6)

$^{13}$CO was produced using the apparatus shown in FIG. 4. Namely, in order to increase the production rate, one new distillation column 11 packed with a "promoting-fluid-dispersion type" structured packing corresponding to Case 2 was added to existing distillation column 23, and connected in a cascade.

In the case of production in the existing distillation column 23 only, a 1.11% $^{13}$CO starting material was fed at a rate of 0.0044 mol/s, with a 99% or more pure $^{13}$CO product produced at a rate of 0.000022 mol/s.

$^{13}$CO production could be increased 10-fold as a result of the addition of new distillation column 11. The operating conditions during this time were roughly equal to the values shown in Table 1 and Table 2.

The experimental conditions are shown in Table 5.

TABLE 5

| Unit | Case 6 |
|---|---|
| Packing | B |
| Specific surface area [m$^2$/m$^3$] | 750 |
| Inner diameter of column [m] | 0.305 |
| Reboiler heating volume [kW] | 38.8 |
| Reynold's number ReG [−] | 3100 |
| Superficial F factor (densimetric superficial velocity) in column [m/s(kg/m$^3$)$^{1/2}$] | 0.7–2.0 |
| Pressure [bar] | 0.8–1.5 |
| Height of column zone A [m] | 44 |
| Height of column zone B [m] | 46 |
| Height of column zone C [m] | 60 |
| Total column height* [m] | 150 |

*Does not include heights of distributor or collector

The optimal range for the operating parameters for distillation column 11 where calculated using computer simulation under the conditions shown in Table 5. As a result, a pressure range of 0.8~1.5 bar, the ratio range of a boil-up rate and bottom product portion F3' flow rate of 900~2000, and a superficial F factor of 2.0 m/s (kg/m$^3$)$^{1/2}$ or less, and preferably, 1.2 m/s (kg/M$^3$)$^{1/2}$ were obtained.

The liquid hold-up volume in the new distillation column 11 at this time was on the order of 5%, and was less than 15% even when adding the liquid hold-up volume in the distributor.

Moreover, in this process, it is not necessary to halt the existing distillation apparatus during the interval from when the distillation apparatus 11 is installed and operations are initiated until the product is output.

Namely, when material gas F1 has been introduced into new distillation column 11 and condenser 12 and reboiler 13 have commenced operations, a material gas containing $^{13}$CO at a concentration of 1.11% which has been feeding to existing distillation column 23 is stopped, and a portion F3' of the bottom product, which is liquid or gas, is introduced in the existing distillation column 23. The concentration of the $^{13}$CO in the portion F3' of the bottom product liquid (or gas) may be 1.11%. Since $^{13}$CO is gradually concentrated by distillation column 11, it is possible to gradually increase the flow rate of product F7 while maintaining the degree of purity of $^{13}$C in product F7 by measuring the concentration $^{13}$C.

The experimental results (calculated results) are shown in detail in Table 6.

TABLE 6

|  | Case 6 |
|---|---|
| F1 Feed gas | |
| Pressure [bar] | 1.13 |
| Flow rate ratio [−] | 1.000 |
| $^{13}$CO mole fraction [−] | 0.0111 |
| F2 Bottom liquid (recycled) | |
| Pressure [bar] | 1.21 |
| Flow rate (normalized) [−] | 159.8 |
| $^{13}$CO mole fraction [−] | 0.0603 |
| F3' Portion of bottom product | |
| Pressure [bar] | 1.21 |
| Flow rate (normalized) [−] | 0.135 |
| $^{13}$CO mole fraction [−] | 0.0603 |
| F4 Reboiler gas | |
| Pressure [bar] | 1.21 |
| Flow rate (normalized) [−] | 159.7 |
| $^{13}$CO mole fraction [−] | 0.0603 |
| F5 Reflux liquid | |
| Pressure [bar] | 0.81 |
| Flow rate (normalized) [−] | 156.1 |
| $^{13}$CO mole fraction [−] | 0.00571 |
| F6 Exhaust gas | |
| Pressure [bar] | 0.81 |
| Flow rate (normalized) [−] | 0.995 |
| $^{13}$CO mole fraction [−] | 0.00571 |
| F7 Product gas | |
| Pressure [bar] | — |
| Flow rate (normalized) [−] | 0.005 |
| $^{13}$CO mole fraction [−] | 0.999 |
| F8 Feedback gas | |
| Pressure [bar] | 1.06 |
| Flow rate (normalized) [−] | 0.129 |
| $^{13}$CO mole fraction [−] | 0.0210 |

Based on the above experimental results and calculations, it could be confirmed that adding one new distillation column having a height of 150 m and an inner diameter of 30.5 cm packed with a "promoting-fluid-dispersion type" structured packing to an existing distillation apparatus increased the volume of $^{13}$CO produced by 10-fold.

When carrying out separation of $^{12}$CO and $^{13}$CO by distillation, the following effects are obtained as a result of employing a distillation column packed orderly with a formed packing or which employs a ordered packing, and in particular as a result of employing a distillation column packed with a "promoting-fluid-dispersion type" structured packing. Namely:

The column diameter can be made large in proportion to the processing volume.

When increasing the process flow rate by increasing the diameter of the distillation column, it is not necessary as in the conventional processes to select the type of random packing suitable for the column diameter. Accordingly, greater freedom of design is permitted. Moreover, the decline in the efficiency of distillation due to muldistribution and the like is greatly improved. Thus, consideration need not be given to increasing the column height in response to the increase in the column diameter in the case of pressure in the column is approximately 1 bar. When the pressure of the distillation column is increased, the column height is increased a little.

The pressure loss is held to a low level, so that the distillation operations can be carried out at a low pressure. Accordingly, the separation coefficient can be increased, increasing the efficiency of distillation. As a result, operations become simple.

It was understood that by operating the apparatus so that the superficial F factor (densimetric superficial velocity) in the column is 1.7 m/s(kg/m$^3$)$^{1/2}$ or less, and preferably 1.2 m/s(kg/m$^3$)$^{1/2}$ or less, the distillation column could be run with no flooding or large loss of pressure.

The liquid hold-up volume could be held below 15%, while the start-up time from when operations commenced until the output of the product could be reduced by about half.

When separating a stable isotope in a $^{12}$C/$^{13}$C system by distillation, the present invention enables a process design for increasing production by adding a new distillation apparatus employing a "promoting-fluid-dispersion type" structured packing as a cascade. In this case, the new apparatus employing the "promoting-fluid-dispersion type" structured packing is connected to an existing apparatus which performs separation by distillation, enabling an increase in production without requiring that the existing apparatus be halted until the product is output.

Moreover, by adding a new apparatus consisting of one distillation column packed with a structured packing ("promoting-fluid-dispersion type" structured packing ), an approximate 10-fold increase in production of $^{13}$CO can be achieved for the apparatus in total.

What is claimed:

1. A process for separation of a stable isotope compound comprising the step of:

supplying a fluid mixture containing a stable isotope compound comprising a lighter isotope compound and a heavier isotope compound comprising at least one stable isotope atom into an apparatus comprising:

a distillation column comprising an upper zone A and a lower zone B, each of zone A and zone B containing an orderly packed formed packing;

a collector and distributor between zone A and zone B;

a feed gas inlet between zone A and zone B;

a gas outlet at an upper portion of the distillation column;

a gas exhaust connected to the gas outlet;

a product outlet for the lighter isotope compound at an upper portion of the distillation column;

a condenser connected to the gas outlet and an upper portion of the distillation column;

a condensed liquid outlet at a lower portion of the distillation column;

a liquid product outlet connected to the condensed liquid outlet;

a product outlet for the heavier isotope compound at a lower portion of the distillation column; and a reboiler connected to the condensed liquid outlet and a lower portion of the distillation column; and performing said separation by liquefaction and distillation in said apparatus.

2. A process for separation of a stable isotope compound according to claim 1, wherein said separation by liquefaction and distillation in the distillation column is carried out by descending liquid and ascending gas flowing along the direction of bulk flow in the distillation column allowing gas-liquid contact mainly on the surface of a formed packing, and by directing the liquid and vapor flows in a direction perpendicular to the direction of bulk flow while at the same time flowing over the surface of the formed packing along the direction of-the bulk flow, so that mass transfer is performed by promoting mixing of the liquid and vapor flows.

3. A process for separation of a stable isotope compound according to claim 1, wherein said stable isotope atom is $^{13}$C and the stable isotope compound is $^{13}$CO.

4. A process for separation of a stable isotope compound according to claim 1, wherein said separation by liquefaction and distillation in the distillation column is carried out so that a superficial F factor (a densimetric superficial gas velocity) in the distillation column is 2.0 m/s(kg/m$^3$)$^{1/2}$ or less, and preferably, 1.2 m/s(kg/m$^3$)$^{1/2}$ or less.

5. A process for separation of a stable isotope compound according to claim 1, wherein said separation by liquefaction and distillation in the distillation column is carried out so that a pressure inside the distillation column during distillation is in the range from 0.8 bar to 3.0 bar.

6. A process for separation of a stable isotope compound according to claim 1, wherein said separation by liquefaction and distillation in the distillation column is carried out at a ratio of a boil-up flow rate and a draw-off flow rate is in the range from 900 to 2000.

7. An apparatus for the separation of a stable isotope compound comprising a lighter isotope compound and a heavier isotope compound by liquefaction and distillation comprising a distillation column comprising an upper zone A and a lower zone B, each of zone A and zone B containing an orderly packed formed packing;

a collector and distributor between zone A and zone B;

a feed gas inlet between zone A and zone B;

a gas outlet at an upper portion of the distillation column;

a gas exhaust connected to the gas outlet;

a product outlet for the lighter isotope compound at an upper portion of the distillation column;

a condenser connected to the gas outlet and an upper portion of the distillation column;

a condensed liquid outlet at a lower portion of the distillation column;

a liquid product outlet connected to the condensed liquid outlet;

a product outlet for the heavier isotope compound at a lower portion of the distillation column; and a reboiler connected to the condensed liquid outlet and a lower portion of the distillation column.

8. An apparatus for separation of a stable isotope compound according to claim 7, wherein said formed packing is a structured packing.

9. An apparatus for separation of a stable isotope compound according to claim 8, wherein said formed packing is a "promoting-fluid-dispersion type" structured packing having a shape such that the descending liquid and the ascending gas flow over the surface of the formed packing along the direction of the bulk flow, while at the same time the liquid and vapor flows are guided at a right angle to the direction of the bulk flow, thereby accomplishing mass transfer while promoting mixing of the liquid and gas.

10. An apparatus for separation of a stable isotope compound according to claim 9, wherein a specific surface area of said "promoting-fluid-dispersion type" structured packing is in the range from 500 $m^2/m^3$ to 1000 $m^2/m^3$.

11. An apparatus arranged in a cascade for separation of a stable isotope compound, comprising:

a main apparatus according to at least one of claims 7 through 10;

another apparatus for separation of a stable isotope compound having at least one distillation column;

a line for introducing material gas into an intermediate part in a distillation column of the main apparatus;

a line for supplying at least a portion of the bottom liquid or the bottom gas of the distillation column to an intermediate part of at least one distillation column of the other apparatus; and a line for returning exhaust gas from the other apparatus to a part between the part where the material gas is supplied and the bottom of the distillation column of the main apparatus.

12. An apparatus arranged in a cascade for separation of a stable isotope compound according to claim 11, wherein a concentration of $^3CO$ in said bottom liquid or in said bottom gas is 10% or less.

13. An apparatus arranged in a cascade for separation of a stable isotope compound according to claim 11, wherein a liquid hold-up volume in said distillation column of said main apparatus is 15% or less.

14. An apparatus according to claim 11, wherein said stable isotope compound is $^{13}CO$.

15. An apparatus arranged in a cascade for separation of a stable isotope compound, comprising:

a main apparatus according to at least one of claims 7 through 10;

another apparatus for separation of a stable isotope compound having at least one distillation column;

a line for introducing material gas into an intermediate part in a distillation column of the main apparatus;

a line for supplying at least a portion of the bottom liquid or the bottom gas of the distillation column to the upper part of at least one distillation column of the other apparatus; and a line for returning exhaust gas from the other apparatus to the bottom of the distillation column of the main apparatus.

16. An apparatus arranged in a cascade for separation of a stable Isotope compound according to claim 15, wherein a concentration of $^{13}CO$ in said bottom liquid or in said bottom gas is 10% or less.

17. An apparatus arranged in a cascade for separation of a stable isotope compound according to claim 15, wherein a liquid hold-up flow rate in said distillation column of the main apparatus is 15% or less.

18. An apparatus according to claim 15, wherein said stable isotope compound is $^{13}CO$.

19. An apparatus according to claim 7, wherein said stable isotope compound is $^{13}CO$.

20. An apparatus according to claim 7, wherein the product outlet for the lighter isotope compound is connected to the gas outlet.

21. An apparatus according to claim 7, wherein the product outlet for the heavier isotope compound is connected to the condensed liquid outlet.

22. An apparatus according to claim 7, wherein the product outlet for the lighter isotope compound is connected to the gas outlet and the product outlet for the heavier isotope compound is connected to the condensed liquid outlet.

* * * * *